(12) United States Patent
Ying et al.

(10) Patent No.: US 12,397,856 B2
(45) Date of Patent: Aug. 26, 2025

(54) ZERO-STEERING HYDRAULIC DRIVE AXLE

(71) Applicant: ZHEJIANG KC MECHANICAL & ELECTRICAL CO., LTD., Yongkang (CN)

(72) Inventors: Haoyu Ying, Yongkang (CN); Xiaowei Sun, Yongkang (CN); Yisheng Lu, Yongkang (CN)

(73) Assignee: ZHEJIANG KC MECHANICAL & ELECTRICAL CO., LTD., Yongkang (CN)

( * ) Notice: Subject to any disclaimer, the term of this patent is extended or adjusted under 35 U.S.C. 154(b) by 0 days.

(21) Appl. No.: 18/003,204

(22) PCT Filed: Dec. 12, 2022

(86) PCT No.: PCT/CN2022/138345
§ 371 (c)(1),
(2) Date: Dec. 23, 2022

(87) PCT Pub. No.: WO2023/160129
PCT Pub. Date: Aug. 31, 2023

(65) Prior Publication Data
US 2024/0101190 A1    Mar. 28, 2024

(30) Foreign Application Priority Data

Feb. 22, 2022 (CN) .......................... 202210162653.4
Feb. 22, 2022 (CN) .......................... 202220358602.4

(51) Int. Cl.
*F16H 63/34*    (2006.01)
*B62D 11/04*    (2006.01)
*F16H 47/02*    (2006.01)

(52) U.S. Cl.
CPC ............. *B62D 11/04* (2013.01); *F16H 47/02* (2013.01); *F16H 63/3416* (2013.01); *F16H 2047/025* (2013.01)

(58) Field of Classification Search
CPC ......... B62D 11/04; F16H 39/14; F16H 47/02; F16H 2047/025; F16H 63/3416; B60K 7/0015
See application file for complete search history.

(56) References Cited

U.S. PATENT DOCUMENTS 5,542,307 A      8/1996    Hasegawa et al.
6,324,843 B1 *  12/2001   Yasuda .................. F16H 39/14
                                                         60/438
(Continued)

FOREIGN PATENT DOCUMENTS

| CN | 102785570 A | 11/2012 |
|----|-------------|---------|
| CN | 114352698 A | 4/2022  |

(Continued)

OTHER PUBLICATIONS

International Search Report for PCT/CN2022/1238345, mailed Feb. 23, 2023.

*Primary Examiner* — Lori Wu
(74) *Attorney, Agent, or Firm* — McDonnell Boehnen Hulbert & Berghoff

(57) ABSTRACT

The present invention provides a zero-steering hydraulic drive axle, which includes: a housing, and the housing is internally provided with a first drive assembly. One end of the first drive assembly is connected to an external power input device for power input, and the other end of the first drive assembly is connected to an external rotation output device. The first drive assembly includes: a plunger pump and a plunger motor. One end of the plunger pump is matched with the power input device, and the other end of the plunger pump is connected to an external oil pipe for oil (Continued)

feeding or supplementing. The plunger motor is matched with the rotation output device. The present invention is simple in overall structure, stable in power output, capable of realizing stepless speed change and pivot steering and turning, and wider in application scene range.

12 Claims, 10 Drawing Sheets

(56) References Cited

U.S. PATENT DOCUMENTS

| | | | |
|---|---|---|---|
| 2002/0139600 A1* | 10/2002 | Nakatani | F16H 47/02 180/291 |
| 2002/0179340 A1 | 12/2002 | Jolliff | |
| 2007/0209456 A1* | 9/2007 | Irikura | B60K 17/105 74/11 |
| 2020/0269673 A1 | 8/2020 | Watt et al. | |
| 2020/0376957 A1 | 12/2020 | Tsukamoto et al. | |

FOREIGN PATENT DOCUMENTS

| | | | |
|---|---|---|---|
| CN | 217422091 U | 9/2022 | |
| CN | 217633725 U | 10/2022 | |
| CN | 115325125 A | 11/2022 | |
| JP | H0882366 A * | 3/1996 | F16H 61/4139 |

* cited by examiner

ZERO-STEERING HYDRAULIC DRIVE AXLE

TECHNICAL FIELD

The present invention relates to the technical field of mechanical equipment transmission mechanisms, and more particularly relates to a zero-steering hydraulic drive axle.

CROSS REFERENCE TO RELATED APPLICATIONS

This application is a U.S. National Phase of International Application No. PCT/CN2022/138345, filed on Dec. 12, 2022, which claims priority to Chinese Patent Application No. 202210162653.4, filed on Feb. 22, 2022 and Chinese Patent Application No. 202220358602.4, filed on Feb. 22, 2022 all of which are incorporated by reference herein in their entirety.

BACKGROUND ART

Engineering mechanical equipment, garden mechanical equipment and transportation mechanical equipment all include a drive system, a transmission system and a power system. Along with constant development of processing technologies and numerical control technologies in the machining field, an increasing amount of mechanical equipment has been developed towards the high-precision, high-efficiency, high-speed and high-intelligence field, and meanwhile, higher requirements have been put forward for the transmission system which has the highest importance. Most of transmission on the current market is multi-stage gear transmission, different rotating speeds are realized by different planetary gear combinations or speed changing is realized in a friction disc manner, the structure is relatively simple and convenient, but may additionally cause problems of short service life of the friction wheel transmission or the multi-stage planetary gears and insufficient steering, which cannot meet different usage scene requirements of users.

SUMMARY OF THE INVENTION

1. To-be-Solved Technical Problem

A technical problem to be solved by the present invention is to provide a zero-steering hydraulic drive axle capable of achieving stepless speed change, pivot steering, more stable power output, independent zone control and simple internal structure.

2. Technical Scheme

To solve the above technical problem, the present invention provides a zero-steering hydraulic drive axle, which includes: a housing, and the housing is internally provided with a first drive assembly. One end of the first drive assembly is connected to an external power input device for power input, and the other end of the first drive assembly is connected to an external rotation output device for power output. The first drive assembly includes: a plunger pump and a plunger motor. One end of the plunger pump is matched with the power input device to realize active rotation of the plunger pump, and the other end of the plunger pump is connected to an external oil pipe for oil feeding or supplementing. The plunger motor is matched with the rotation output device, and the plunger pump is conducted with the plunger motor through an oil way to realize power transmission from the plunger pump to the plunger motor. According to the arrangement of the structure, the plunger pump rotates through power input of the power input device, so as to generate an oil pressure to pump oil to the plunger motor from the plunger pump to realize rotation of the plunger motor, thereby completing power output of the rotation output device. Stepless speed change can be realized by abandoning conventional gear transmission, meanwhile, the internal structure is simple, the power output is more stable, the service life is longer, and the using effects are better.

Furthermore, the first drive assembly includes a swashplate. The swashplate is arranged in the housing in an angle adjustable manner, and the swashplate is internally provided with an accommodating cavity. The plunger pump is arranged in the accommodating cavity. According to the arrangement of the structure, up-down angle adjustment can be realized by the swashplate. Forward rotation, reverse rotation or idling of the rotation output device can be realized by combining a first thrust bearing. The internal structure is simple, and meanwhile, a user can conveniently perform operation and usage.

Furthermore, the swashplate and the housing are connected through an adjusting assembly. The adjusting assembly includes an adjusting member and return blocks. The return blocks are symmetrically arranged at two ends of one side of the adjusting member, and an elastic member is arranged between the return blocks. The adjusting member is fixedly connected to one end of the swashplate. According to the arrangement of the structure, the adjusting member can adjust an angle of the swashplate, thereby guaranteeing that the swashplate can be more stably arranged on the housing, making the overall structure firmer, and guaranteeing power output stability. In addition, due to the adjusting member, the user can conveniently perform rotational adjustment on the swashplate from outside, which makes the operation more convenient.

Furthermore, the plunger pump is arranged below the plunger motor. An oil distribution plate is arranged on one side of the plunger pump and the plunger motor in a sealed manner. Installation support portions are formed on two sides of the oil distribution plate, and the installation support portions are coaxially connected to the rotation output device to fix the oil distribution plate in the housing. The oil way conduction between the plunger pump and the plunger motor can be controlled by the oil distribution plate, so that the oil pressure generated by the plunger pump drives the plunger motor to rotate, thereby realizing power transmission. The internal structure occupies less space, the sealing performance is better, the power output efficiency is higher, and meanwhile, stepless speed change can be realized.

Furthermore, an oil inlet plate is arranged on one side of the oil distribution plate in a sealed manner. An overpressure valve is formed on an outer side of the oil inlet plate, and the overpressure valve is in sealed communication with an interior of the housing for oil supply between the plunger pump and the plunger motor. By means of the oil inlet plate, normal work can be prevented from being influenced by internal oil leakage, and oil can be supplemented to guarantee the normal work of the internal structure.

Furthermore, the plunger pump includes: a first cylinder block and a first plunger. The first cylinder block is rotationally arranged in the swashplate, and the first plunger and an input shaft of the power input device are in synchronous rotation connection. The first plunger is annularly arranged in the first cylinder block and is arranged in the same direction with the input shaft. A first thrust bearing is arranged between the plunger pump and the swashplate. One end of the first plunger is arranged in the first cylinder block, and the other end of the first plunger is matched with the first thrust bearing. The first cylinder block can synchronously rotate with the input shaft, and is combined with the first thrust bearing, thereby making the first plunger move in the first cylinder block in a reciprocating manner. Oil pressure control is realized, which can guarantee that the plunger motor can be driven to work, and when the swashplate is adjusted, an inclination angle of the first thrust bearing can be changed, so as to realize different internal oil pressure control.

Furthermore, the plunger motor includes: a second cylinder block and a second plunger. The second cylinder block and an output shaft of the rotation output device are in synchronous rotation connection. The second plunger is annularly arranged in the second cylinder block and is coaxially arranged with the output shaft. The housing is provided with a fender chute. A second thrust bearing is arranged between the second cylinder block and the fender chute. One end of the second plunger is matched with the second thrust bearing. Elastomers are arranged between the first plunger and the first cylinder block and between the second plunger and the second cylinder block. The second thrust bearing is matched with the fender chute, the fender chute is obliquely formed in the housing by a certain angle, and the oil pressure of the plunger pump can drive the second plunger to be matched with the second thrust bearing to move in the second cylinder block in a reciprocating manner, thereby driving the second cylinder block to rotate and realizing power output. The overall structure is simple, the power output is stable, and stepless speed change can be realized.

Furthermore, the oil distribution plate is provided with a first oil way channel and a second oil way channel, and two ends of the first oil way channel and the second oil way channel are communicated with the plunger pump and the plunger motor respectively. By means of the oil way channels, high-oil-pressure and low-oil-pressure oil ways can be guaranteed, and normal usage of the internal structure is guaranteed.

Furthermore, shims are arranged between the oil distribution plate and the plunger pump and between the oil distribution plate and the plunger motor, thereby improving the seal effect to a certain extent.

Furthermore, an outer side of one end, close to the plunger pump, of the oil distribution plate is provided with an oil inlet passage. Two ends of the oil inlet passage are both provided with one-way control valves for controlling external oil to flow into the plunger pump, so that a certain oil supplementing effect can be realized on one-way circulation inside the plunger pump, and the internal structure arrangement is more reasonable.

Furthermore, a bypass assembly used for oil way control during drive axle idling is arranged at an upper end of the oil distribution plate, and the bypass assembly is arranged at an upper end of the plunger motor. The bypass assembly includes a bypass valve and a bypass controller. The bypass valve is communicated with the oil distribution plate. The bypass controller is used for controlling conduction or closure of the first oil way channel and the second oil way channel. One end of the bypass valve is arranged in the oil distribution plate. The bypass valve can perform passage conduction or passage closure in the oil distribution plate by rotating the bypass controller. According to the arrangement of the structure, idling work of the plunger pump and the plunger motor can be realized through the bypass assembly, and normal usage is prevented from being influenced by excessive internal oil pressure.

Furthermore, the rotation output device is further provided with a locking assembly. The locking assembly includes: a locking gear and a locking block. The locking gear is fixedly connected to the output shaft of the rotation output device. The locking block is matched with the locking gear during locking. The locking assembly can lock and limit the rotation output device, guarantee the internal structure to be more stable, solve the safety problem caused when the rotation output device rotates after being stopped, and guarantee the safety to a certain extent.

Furthermore, the housing is further internally provided with a second transmission assembly, and the second transmission assembly has the same structure as the first transmission assembly. The first transmission assembly and the second transmission assembly are symmetrically arranged in the housing, and zone control can be realized by means of the first transmission assembly and the second transmission assembly. Pivot steering of the rotation output devices on two sides can be guaranteed, and the internal structure is simple.

Furthermore, an outer side end of the first transmission assembly is provided with a first gear transmission set. An outer side end of the second transmission assembly is provided with a second gear transmission set. The first gear transmission set is provided with a first drive shaft through connection for controlling one side of the housing. The second gear transmission set is provided with a second drive shaft through connection for controlling the other side of the housing. The internal structure is reasonable in arrangement, and normal work of the equipment can be guaranteed. By means of the first drive shaft and the second drive shaft, two-side independent control can be realized, the mechanical equipment can meet different scene usage requirements, meanwhile, the pivot steering function of the hydraulic drive axle is guaranteed, and power output is more stable.

3. Beneficial Effects

Compared with the prior art, the zero-steering hydraulic drive axle in the present invention has the advantages that more stable power output can be guaranteed, two-way independent zone control can be realized, and a pivot steering effect of the equipment is realized; by means of the plunger pump and the plunger motor, the oil pressure is utilized for drive transmission, conventional gear meshing transmission is abandoned, and stepless speed change can be realized; in addition, two-side output can be independently controlled by the independent transmission assemblies, turning and other different scene requirements are met, and meanwhile, it is guaranteed that the power output efficiency is higher, the overall structure is simpler, and the service life is longer.

Figure 1:
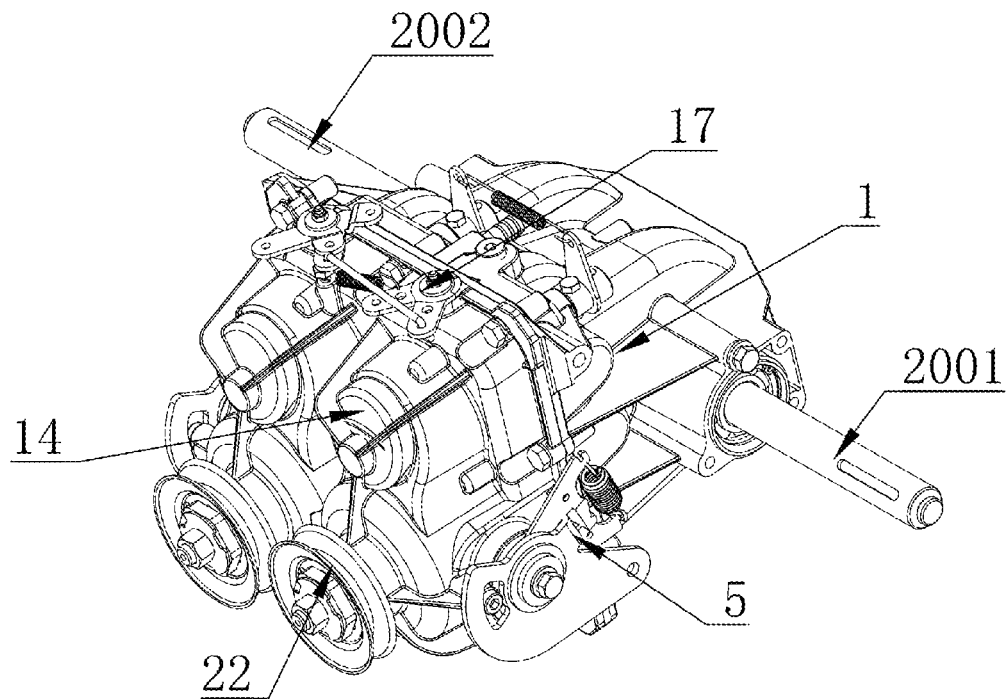
FIG. 1 is a three-dimensional diagram of a zero-steering hydraulic drive axle according to the present invention.

In the figures: 1—housing, 201—first drive assembly, 202—second drive assembly, 301—plunger pump, 302—plunger motor, 4—swashplate, 401—accommodating cavity, 5—adjusting assembly, 501—adjusting member, 502—return block, 6—elastic member, 7—oil distribution plate, 8—oil inlet plate, 801—overpressure valve, 901—first cylinder block, 902—second cylinder block, 1001—first plunger, 1002—second plunger, 11—input shaft, 1201—first thrust bearing, 1202—second thrust bearing, 1301—first oil way channel, 1302—second oil way channel, 14—fender chute, 15—oil inlet passage, 16—one-way control valve, 17—bypass assembly, 1701—bypass valve, 1702—bypass controller, 18—locking assembly, 1801—locking gear, 1802—locking block, 1901—first gear transmission set, 1902—second gear transmission set, 2001—first drive shaft, 2002—second drive shaft, 21—output shaft, 22—belt pulley, 23—shim, 24—installation support portion, and 25—elastomer.

DETAILED DESCRIPTION OF THE INVENTION

Specific implementation modes of the present invention are further described in detail in conjunction with drawings and embodiments. The following embodiments are used for explaining the present invention but not for limiting the scope of the present invention.

Referring to FIG. 1-FIG. 13, a zero-steering hydraulic drive axle includes: a housing 1, and the housing 1 is internally provided with a first drive assembly 201. One end of the first drive assembly 201 is connected to an external power input device for power input, and the other end of the first drive assembly 201 is connected to an external rotation output device for power output. The first drive assembly 201 includes: a plunger pump 301 and a plunger motor 302. One end of the plunger pump 301 is matched with the power input device to realize active transmission of the plunger pump 301, and the other end of the plunger pump 301 is connected to an external oil pipe for oil feeding or supplementing. The plunger motor 302 is matched with the rotation output device, and the plunger pump 301 is conducted with the plunger motor 302 through an oil way to realize power transmission from the plunger pump 301 to the plunger motor 302. The plunger pump 301 rotates through power input of the power input device, so as to generate an oil pressure to pump oil to the plunger motor 302 from the plunger pump 301 to realize rotation of the plunger motor 302, thereby completing power output of the rotation output device. Stepless speed change can be realized by abandoning conventional gear transmission, meanwhile, the internal structure is simple, the power output is more stable, the service life is longer, and the using effects are better.

Referring to FIG. 1, FIG. 3, FIG. 4 and FIG. 7, the first drive assembly 201 includes a swashplate 4. The swashplate 4 is arranged in the housing 1 in an angle adjustable manner, and the swashplate 4 is internally provided with an accommodating cavity 401. The plunger pump 301 is arranged in the accommodating cavity 401, and up-down angle adjustment can be realized by the swashplate 4. Forward rotation, reverse rotation or idling of the rotation output device can be realized by combining a first thrust bearing 1201. The internal structure is simple, and meanwhile, a user can conveniently perform operation and usage.

Figure 2:
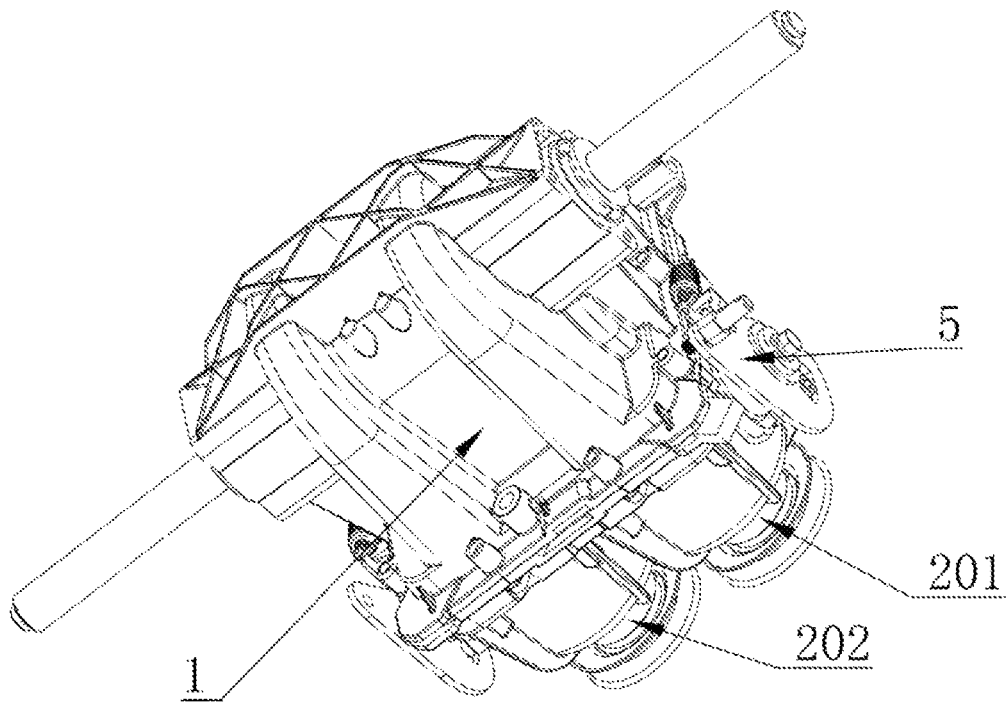
FIG. 2 is a three-dimensional diagram of a zero-steering hydraulic drive axle with the bottom facing upward according to the present invention.
Figure 3:
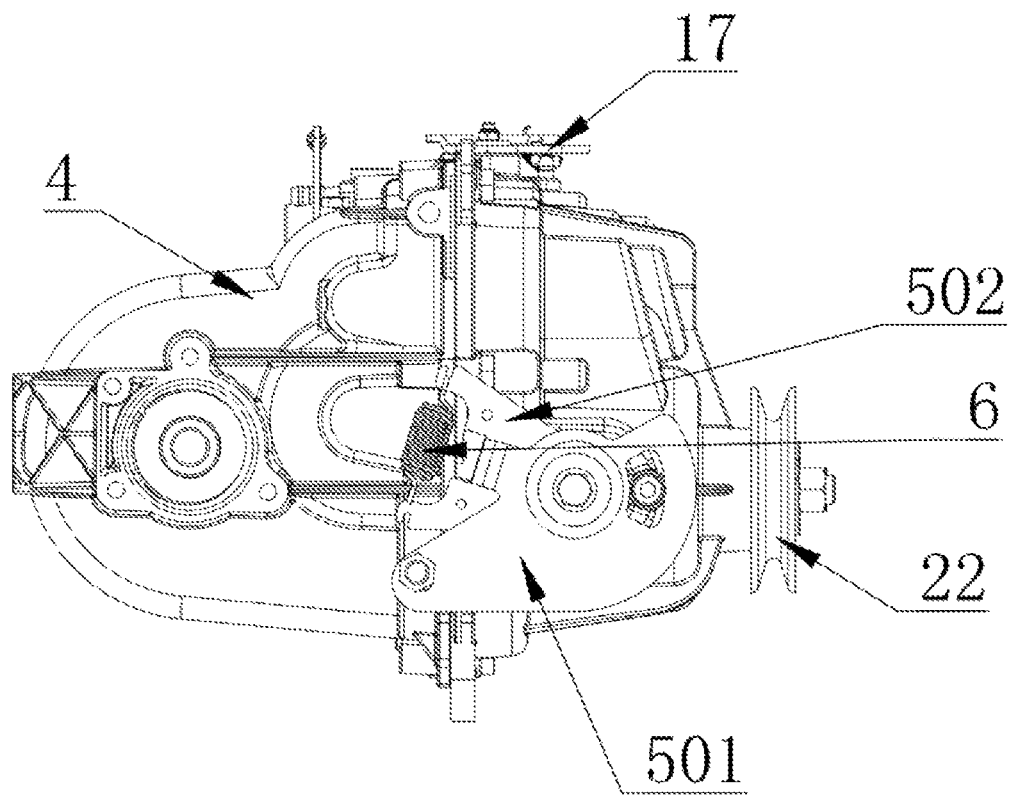
FIG. 3 is a side view of a zero-steering hydraulic drive axle according to the present invention.

Referring to FIG. 1, FIG. 2 and FIG. 3, the swashplate 4 and the housing 1 are connected through an adjusting assembly 5. The adjusting assembly 5 includes an adjusting member 501 and return blocks 502. The return blocks 502 are symmetrically arranged at two ends of one side of the adjusting member 501, and an elastic member 6 is arranged between the return blocks 502. The adjusting member 501 is fixedly connected to one end of the swashplate 4, and the adjusting member 501 can adjust an angle of the swashplate 4, thereby guaranteeing that the swashplate 4 can be more stably arranged on the housing 1, making the overall structure firmer, and guaranteeing power output stability. In addition, due to the adjusting member, the user can conveniently perform rotational adjustment on the swashplate 4 from outside, which makes the operation more convenient.

Referring to FIG. 4, FIG. 7, FIG. 9 and FIG. 10, the plunger pump 301 is arranged below the plunger motor 302. An oil distribution plate 7 is arranged on one side of the plunger pump 301 and the plunger motor 302 in a sealed manner. Installation support portions 24 are formed on two sides of the oil distribution plate 7, and the installation support portions 24 are coaxially connected to the rotation output device to fix the oil distribution plate 7 in the housing 1. The oil way conduction between the plunger pump 301 and the plunger motor 302 can be controlled by the oil distribution plate 7, so that the oil pressure generated by the plunger pump 301 drives the plunger motor 302 to rotate, thereby realizing power transmission. The internal structure occupies less space, the sealing performance is better, the power output efficiency is higher, and meanwhile, stepless speed change can be realized.

Figure 5:
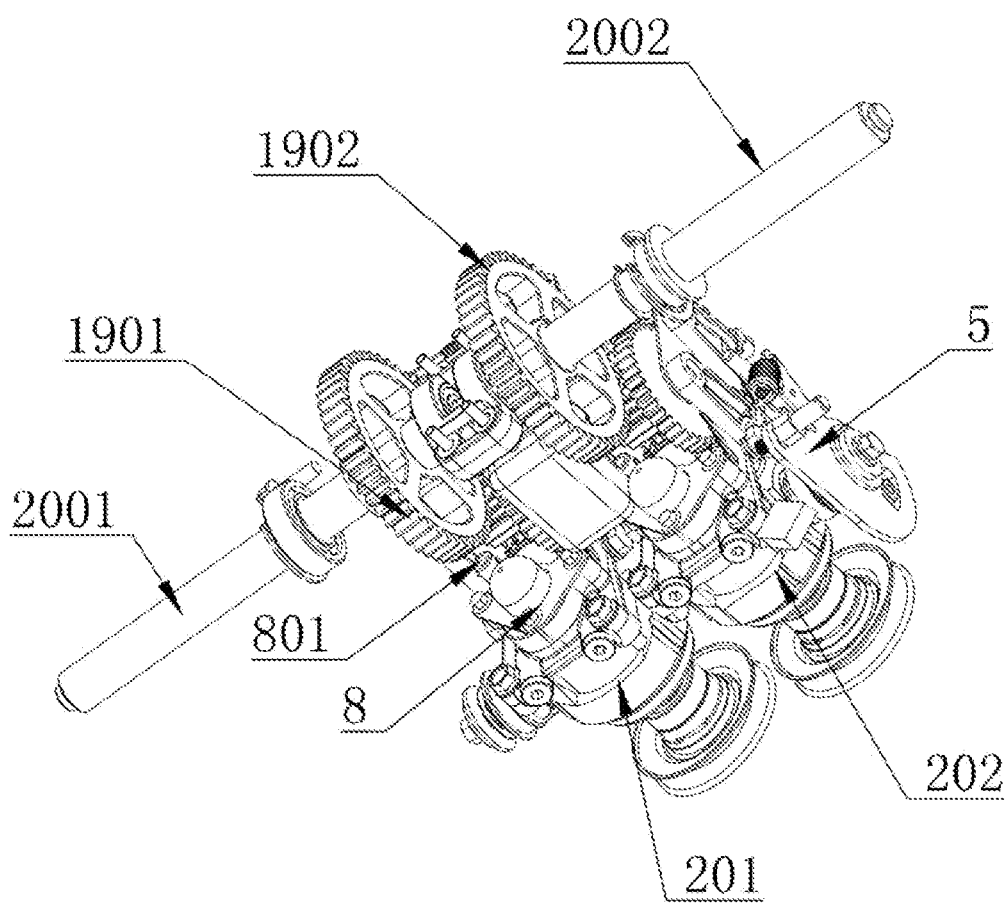
FIG. 5 is a three-dimensional diagram of a zero-steering hydraulic drive axle with a housing being removed and the bottom facing upward according to the present invention.
Figure 7:
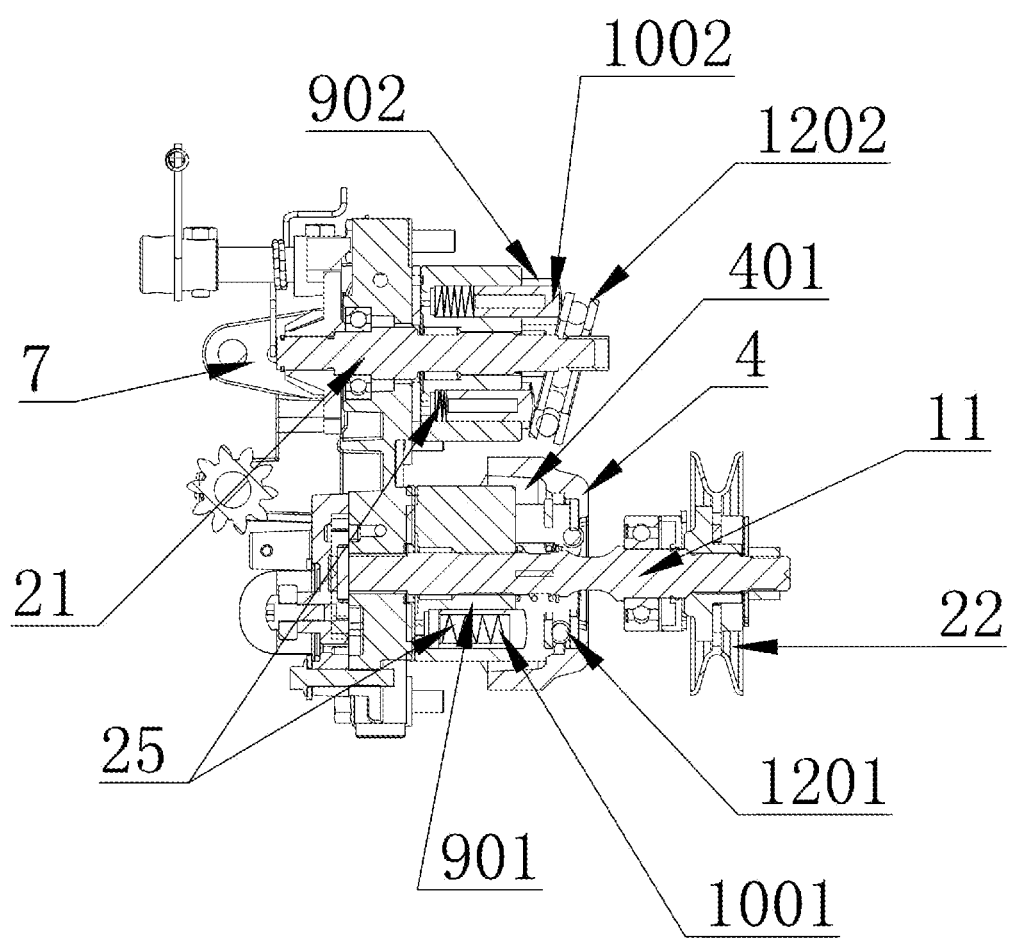
FIG. 7 is a cross-sectional view of a zero-steering hydraulic drive axle with a housing being removed according to the present invention.
Figure 8:
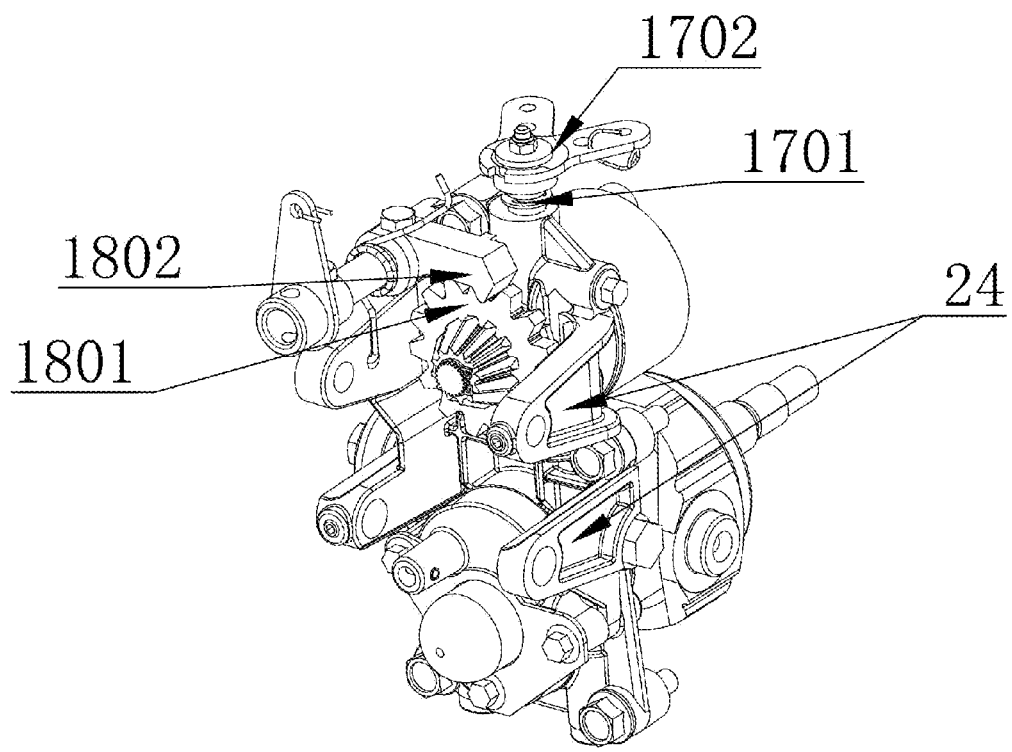
FIG. 8 is a schematic structural diagram of a first drive assembly and an oil distribution plate of a zero-steering hydraulic drive axle according to the present invention.

Referring to FIG. 5, FIG. 7 and FIG. 8, an oil inlet plate 8 is arranged on one side of the oil distribution plate 7 in a sealed manner. An overpressure valve 801 is formed on an outer side of the oil inlet plate 8, and the overpressure valve 801 is in sealed communication with an interior of the housing 1 for oil supply between the plunger pump 301 and the plunger motor 302. By means of the oil inlet plate 8, normal work can be prevented from being influenced by internal oil leakage, and oil can be supplemented to guarantee the normal work of the internal structure.

Figure 10:
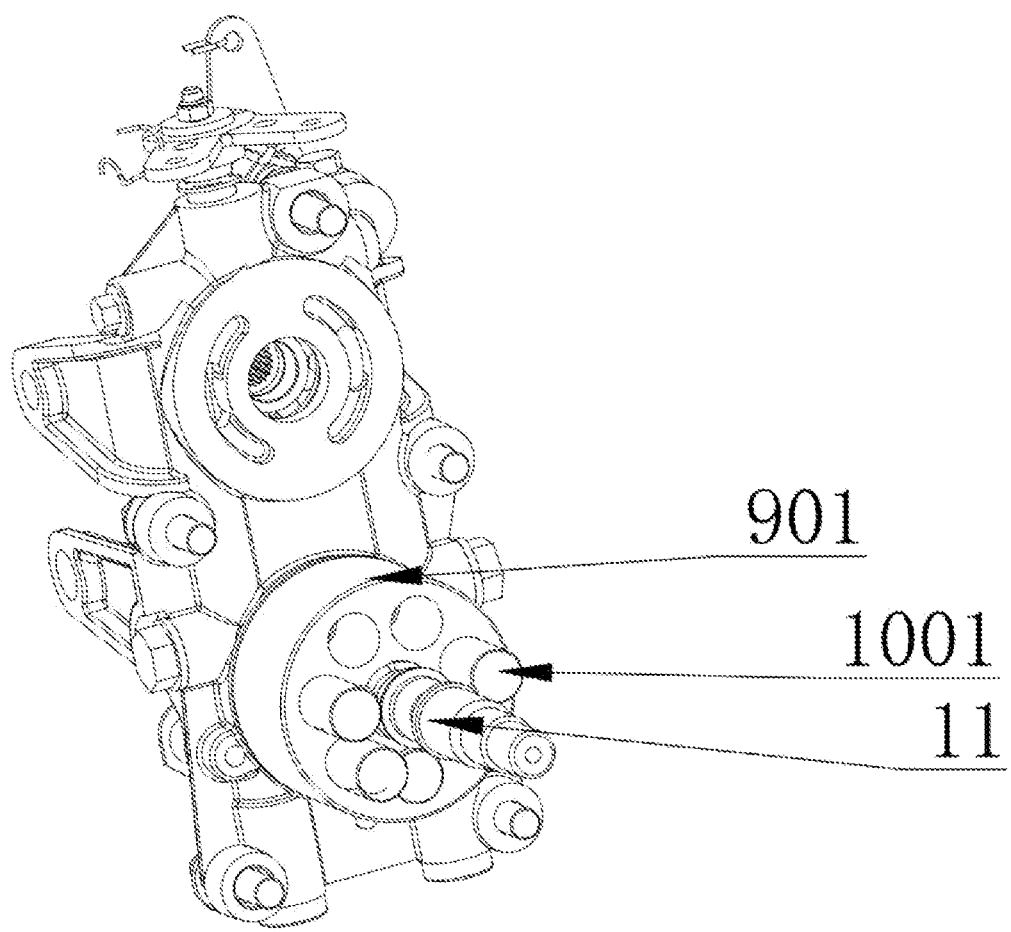
FIG. 10 is a schematic structural diagram of a first drive assembly of a zero-steering hydraulic drive axle with a plunger motor being removed according to the present invention.

Referring to FIG. 7 and FIG. 10, the plunger pump 301 includes: a first cylinder block 901 and a first plunger 1001. The first cylinder block 901 is rotationally arranged in the swashplate 4, and the first plunger 1001 and an input shaft 11 of the power input device are in synchronous rotation connection. An outer side end of the input shaft 11 is provided with a belt pulley 22. A fan for cooling the plunger pump 301 is rotationally arranged between the belt pulley 2 and the plunger pump 301. The first plunger 1001 is annularly arranged in the first cylinder block 901 and is arranged in the same direction with the input shaft 11. A first thrust bearing 1201 is arranged between the plunger pump 301 and the swashplate 4. One end of the first plunger 1001 is arranged in the first cylinder block 901, and the other end of the first plunger 1001 is matched with the first thrust bearing 1201. The first cylinder block 901 can synchronously rotate with the input shaft 11, and is combined with the first thrust bearing 1201, thereby making the plunger pump 301 move in the first cylinder block 901 in a reciprocating manner. Oil pressure control is realized, which can guarantee that the plunger motor 302 can be driven to work, and when the swashplate 4 is adjusted, an inclination angle of the first thrust bearing 1201 can be changed, so as to realize different internal oil pressure control.

Figure 9:
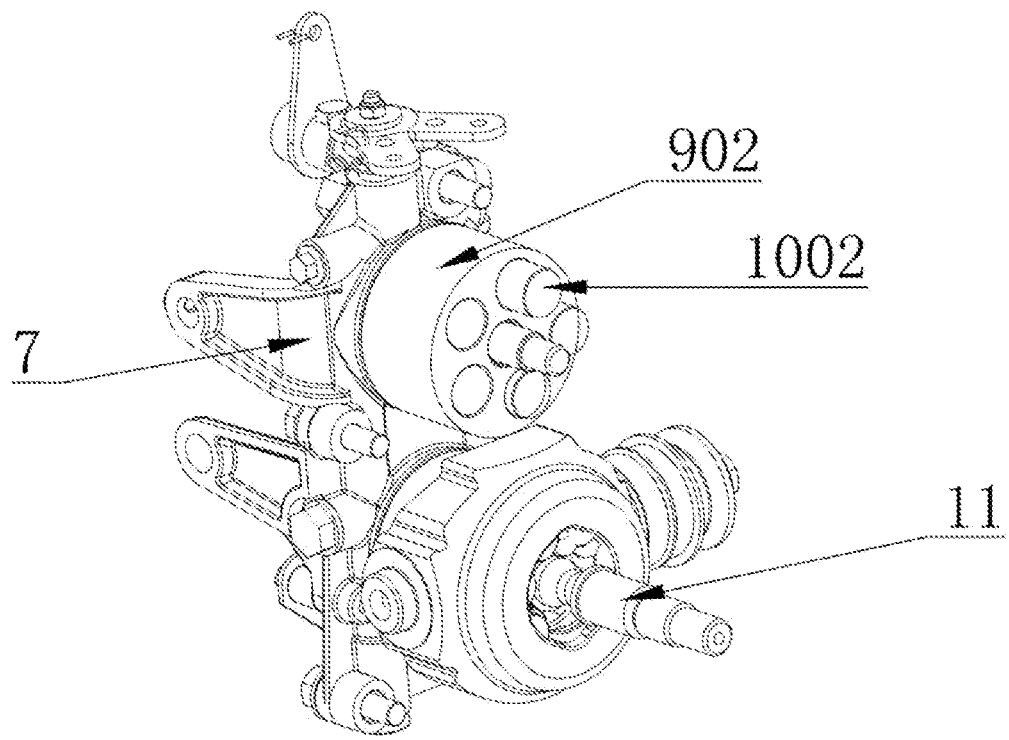
FIG. 9 is a three-dimensional diagram of a first drive assembly and an oil distribution plate of a zero-steering hydraulic drive axle according to the present invention.

Referring to FIG. 7 and FIG. 9, the plunger motor 302 includes: a second cylinder block 902 and a second plunger 1002. The second cylinder block 902 and an output shaft 21 of the rotation output device are in synchronous rotation connection. The second plunger 1002 is annularly arranged in the second cylinder block 902 and is coaxially arranged with the output shaft 21. The housing 1 is provided with a fender chute 14. A second thrust bearing 1202 is arranged between the second cylinder block 902 and the fender chute 14. One end of the second plunger 1002 is matched with the second thrust bearing 1202. Elastomers 25 are arranged between the first plunger 901 and the first cylinder block 1001 and between the second plunger 902 and the second cylinder block 902. The second thrust bearing 1202 is matched with the fender chute 14, the fender chute 14 is obliquely formed in the housing 1 by a certain angle, and the oil pressure of the plunger pump 301 can drive the plunger motor 302 to be matched with the second thrust bearing 1202 to move in the second cylinder block 902 in a reciprocating manner, thereby driving the second cylinder block 902 to rotate and realizing power output. The overall structure is simple, the power output is stable, and stepless speed change can be realized.

Figure 11:
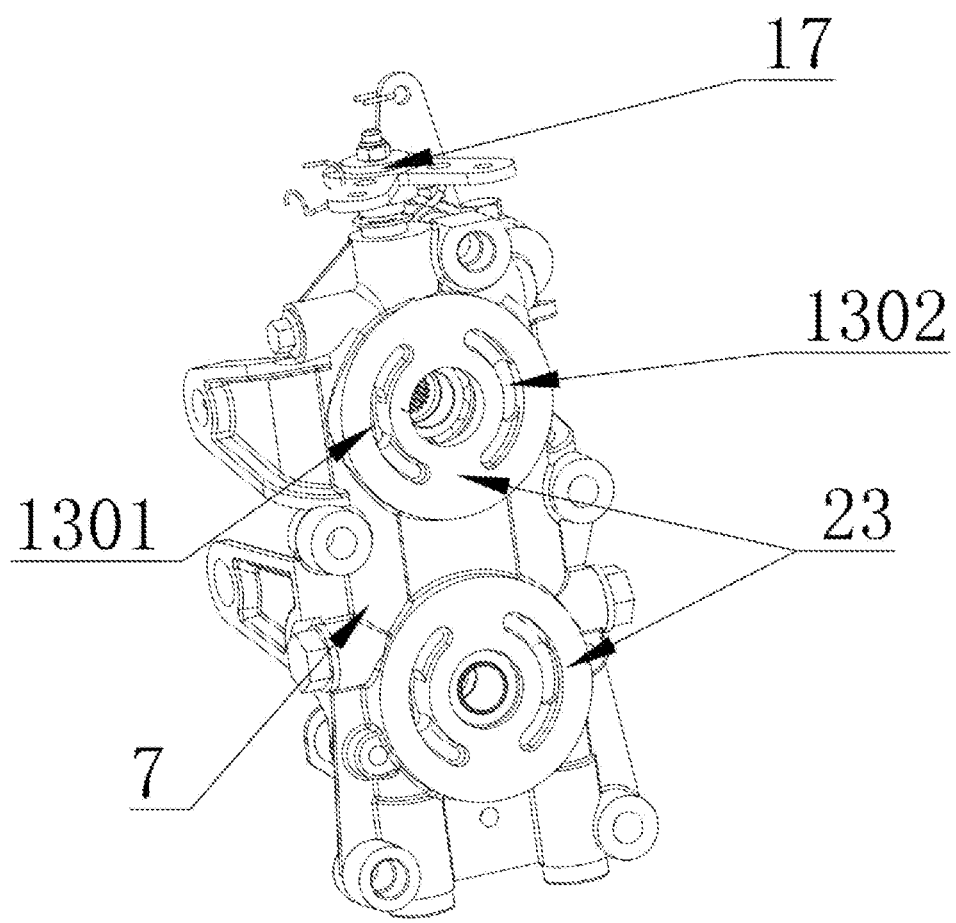
FIG. 11 is a schematic structural diagram of an oil distribution plate and shims of a zero-steering hydraulic drive axle according to the present invention.
Figure 12:
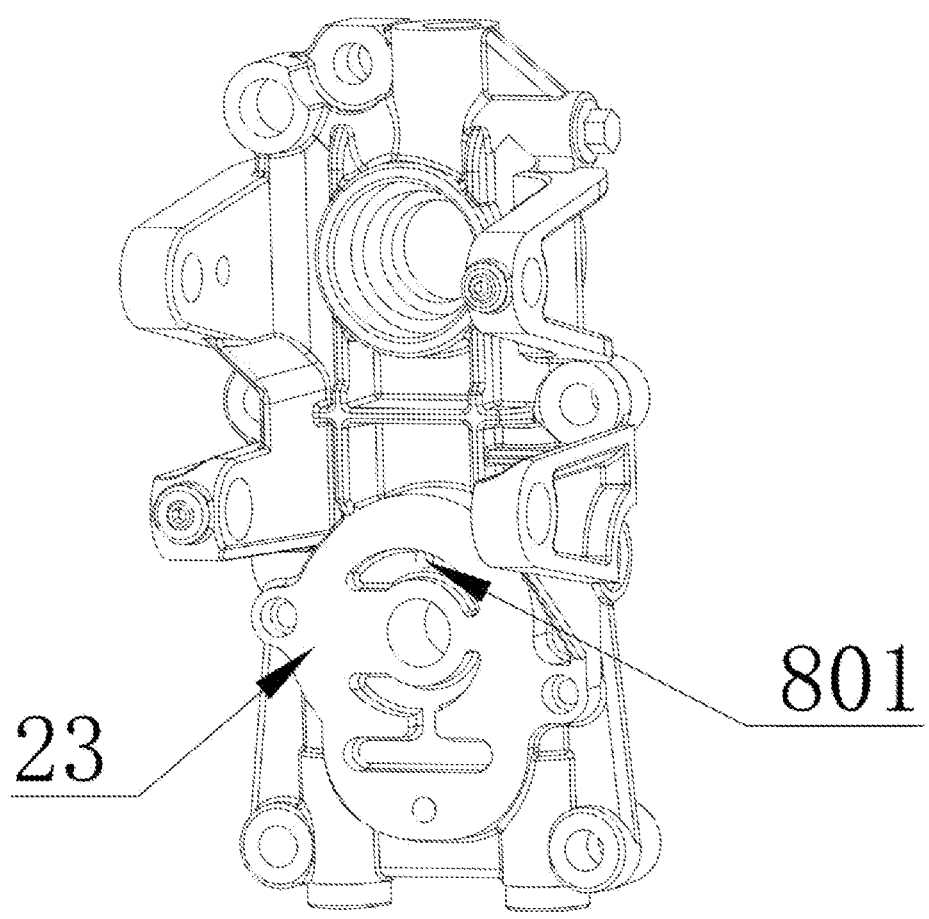
FIG. 12 is a schematic structural diagram of an oil distribution plate of a zero-steering hydraulic drive axle according to the present invention.
Figure 13:
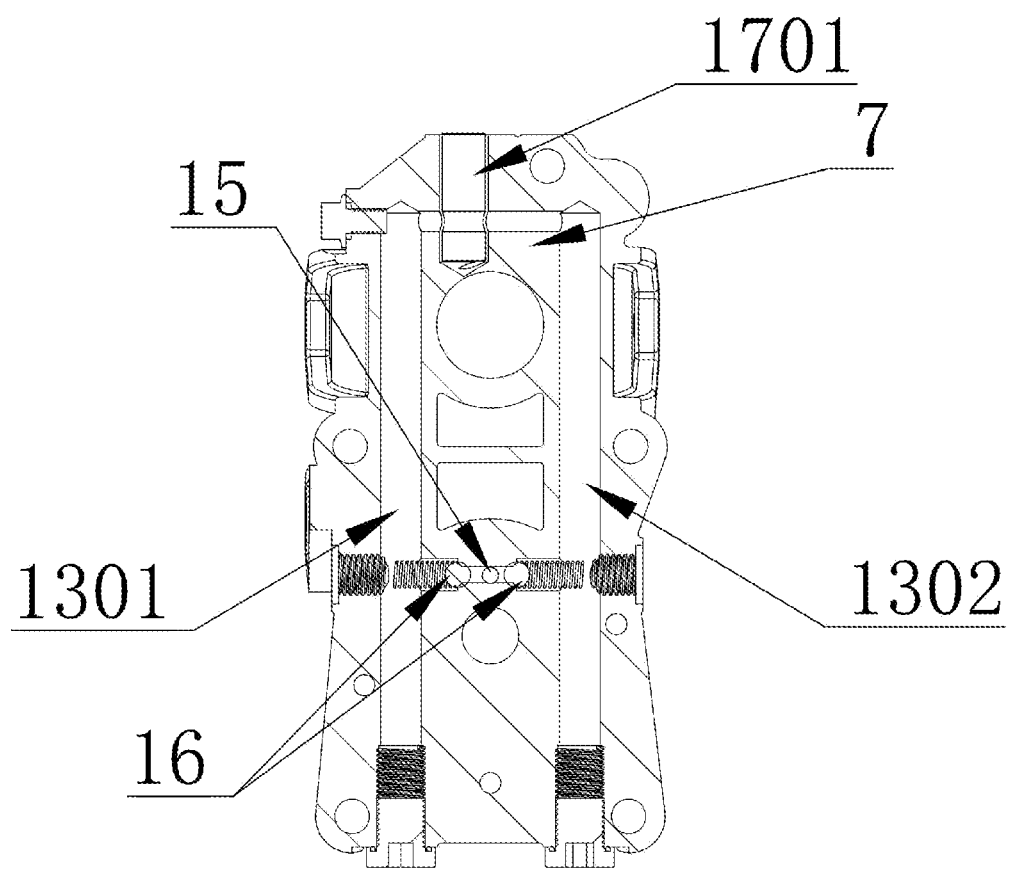
FIG. 13 is a cross-sectional view of an oil distribution plate of a zero-steering hydraulic drive axle according to the present invention.

Referring to FIG. 11, FIG. 12 and FIG. 13, the oil distribution plate 7 is provided with a first oil way channel 1301 and a second oil way channel 1302, and two ends of the first oil way channel 1301 and the second oil way channel 1302 are communicated with the plunger pump 301 and the plunger motor 302 respectively. By means of the oil way channels, high-oil-pressure and low-oil-pressure oil ways can be guaranteed, and normal usage of the internal structure is guaranteed.

Referring to FIG. 11 and FIG. 12, shims 23 are arranged between the oil distribution plate 7 and the plunger pump 301 and between the oil distribution plate 7 and the plunger motor 302, thereby improving the seal effect to a certain extent.

Referring to FIG. 13, an outer side of one end, close to the plunger pump 301, of the oil distribution plate 7 is provided with an oil inlet passage 15. Two ends of the oil inlet passage 15 are both provided with one-way control valves 16 for controlling external oil to flow into the plunger pump 301, so that a certain oil supplementing effect can be realized on one-way circulation inside the plunger pump 301, and the internal structure arrangement is more reasonable.

Figure 4:
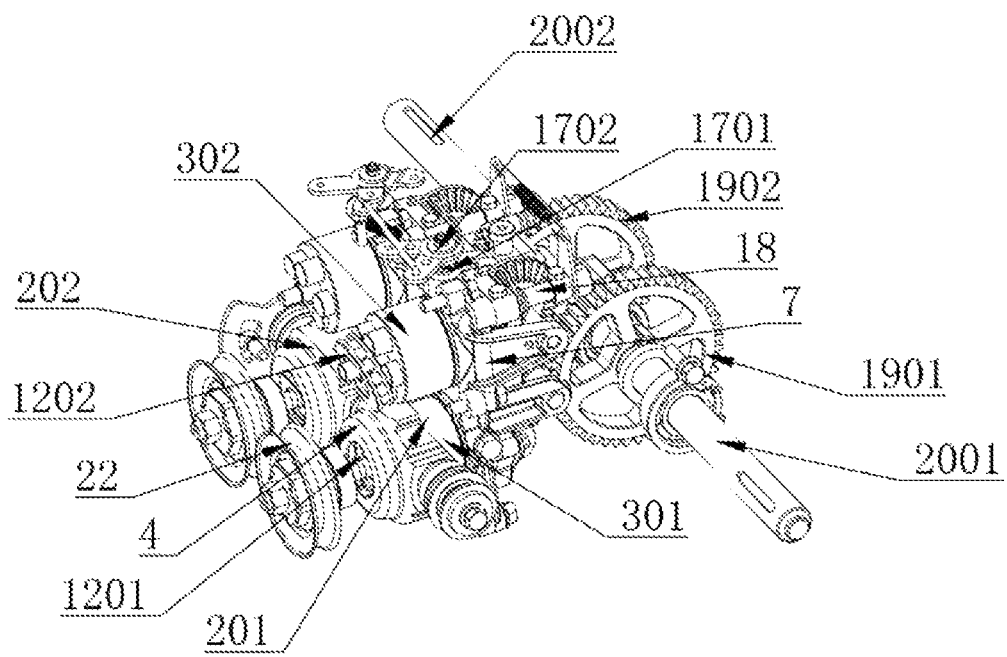
FIG. 4 is a schematic structural diagram of a zero-steering hydraulic drive axle with a housing being removed according to the present invention.

Referring to FIG. 1, FIG. 3 and FIG. 4, a bypass assembly 17 used for oil way control during drive axle idling is arranged at an upper end of the oil distribution plate 7, and the bypass assembly 17 is arranged at an upper end of the plunger motor 302. The bypass assembly 17 includes a bypass valve 1701 and a bypass controller 1702. The bypass valve 1701 is communicated with the oil distribution plate 7. The bypass controller 1702 is used for controlling conduction or closure of the first oil way channel 1301 and the second oil way channel 1302. One end of the bypass valve 1701 is arranged in the oil distribution plate 7 for conduction or closure. The bypass valve 1701 can perform passage conduction or passage closure in the oil distribution plate 7 by rotating the bypass controller 1702, idling work of the plunger pump 301 and the plunger motor 302 can be realized through the bypass assembly 17, and normal usage is prevented from being influenced by excessive internal oil pressure.

Referring to FIG. 4 and FIG. 8, the rotation output device is further provided with a locking assembly 18. The locking assembly 18 includes: a locking gear 1801 and a locking block 1802. The locking gear 1801 is fixedly connected to the output shaft 21 of the rotation output device. The locking block 1802 is matched with the locking gear 1801 during locking, thereby locking and limiting the rotation output device, guaranteeing the internal structure to be more stable, solving the safety problem caused when the rotation output device rotates after being stopped, and guaranteeing the safety to a certain extent.

Referring to FIG. 4, FIG. 5, FIG. 6 and FIG. 7, the housing 1 is further internally provided with a second transmission assembly 202, and the second transmission assembly 202 has the same structure as the first transmission assembly 201. The first transmission assembly 201 and the second transmission assembly 202 are symmetrically arranged in the housing 1, and zone control can be realized by means of the first transmission assembly 201 and the second transmission assembly 202. Pivot steering of the rotation output devices on two sides can be guaranteed, and the internal structure is simple.

Figure 6:
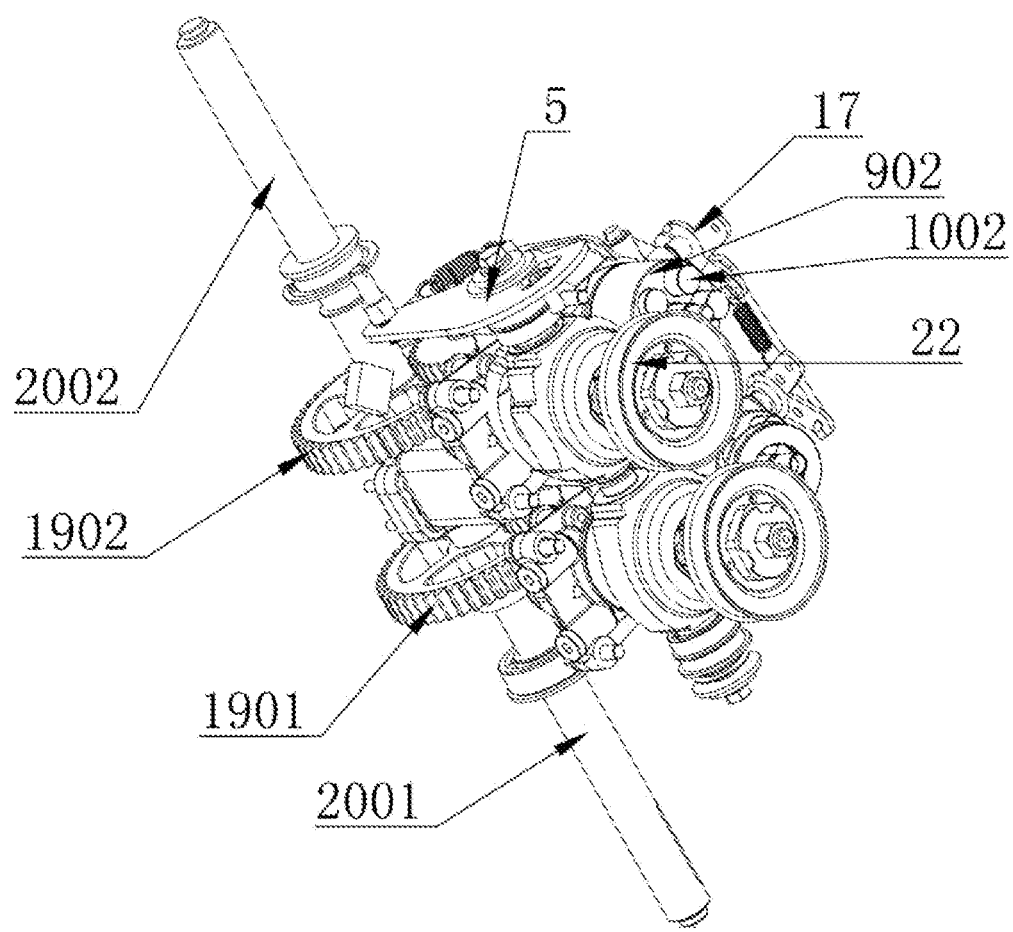
FIG. 6 is a schematic structural diagram of a zero-steering hydraulic drive axle with the bottom facing upward according to the present invention.

Referring to FIG. 4, FIG. 5 and FIG. 6, an outer side end of the first transmission assembly 201 is provided with a first gear transmission set 1901. An outer side end of the second transmission assembly 202 is provided with a second gear transmission set 1902. The first gear transmission set 1901 is provided with a first drive shaft 2001 through connection for controlling one side of the housing 1. The second gear transmission set 1902 is provided with a second drive shaft 2002 through connection for controlling the other side of the housing 1. The internal structure is reasonable in arrangement, and normal work of the equipment can be guaranteed. By means of the first drive shaft 2001 and the second drive shaft 2002, two-side independent control can be realized, the mechanical equipment can meet different scene usage requirements, meanwhile, the pivot steering function of the hydraulic drive axle is guaranteed, and power output is more stable.

According to the zero-steering hydraulic drive axle in the embodiment, by means of the plunger pump and the plunger motor, the oil pressure is utilized for drive transmission, thereby guaranteeing more stable power output, realizing two-way independent zone control and a pivot steering effect of the equipment; conventional gear meshing transmission is abandoned, and stepless speed change can be realized. In addition, two-side output can be independently controlled by the independent transmission assemblies, turning and other different scene requirements are met, and meanwhile, it is guaranteed that the power output efficiency is higher, the overall structure is simpler, and the service life is longer.

The above contents are merely preferred implementation modes of the present invention. It should be noted that a plurality of improvements and modifications may be made by those ordinary skilled in the art without departing from the technical principle of the present invention, and such improvements and modifications should fall within the scope of protection of the present invention.

The invention claimed is:

1. A zero-steering hydraulic drive axle, comprising: a housing (1), wherein the housing (1) has a first drive assembly (201) that is internally provided, one end of the first drive assembly (201) is connected to an external power input device for power input, and the other end of the first drive assembly (201) is connected to an external rotation output device for power output; the first drive assembly (201) comprises: a plunger pump (301) and a plunger motor (302), one end of the plunger pump (301) is matched with the power input device to realize active rotation of the plunger pump (301), the other end of the plunger pump (301) is connected to an external oil pipe for oil feeding or supplementing, the plunger motor (302) is matched with the rotation output device, and the plunger pump (301) is conducted with the plunger motor (302) through an oil way to realize power transmission from the plunger pump (301) to the plunger motor (302);

wherein the first drive assembly (201) comprises a swashplate (4), the swashplate (4) is arranged in the housing (1) in an angle adjustable manner, the swashplate (4) is internally provided with an accommodating cavity (401), and the plunger pump (301) is arranged in the accommodating cavity (401);

wherein the plunger pump (301) comprises: a first cylinder block (901) and a first plunger (1001), the first cylinder block (901) is rotationally arranged in the swashplate (4), the first plunger (1001) and an input shaft (11) of the power input device are in synchronous rotation connection, and the first plunger (1001) is annularly arranged in the first cylinder block (901) and is arranged in the same direction with the input shaft (11);

wherein the plunger motor (302) comprises: a second cylinder block (902) and a second plunger (1002), the second cylinder block (902) and an output shaft (13) of the rotation output device are in synchronous rotation connection, and the second plunger (1002) is annularly arranged in the second cylinder block (902) and coaxially arranged with the output shaft (13);

wherein the housing (1) is provided with a fender chute (14), a second thrust bearing (1202) is arranged between the second cylinder block (902) and the fender chute (14), one end of the second plunger (1002) is matched with the second thrust bearing (1202), and elastomers (25) are arranged between the first plunger (901) and the first cylinder block (1001) and between the second plunger (902) and the second cylinder block (902).

2. The zero-steering hydraulic drive axle according to claim 1, wherein the swashplate (4) and the housing (1) are connected through an adjusting assembly (5), the adjusting assembly (5) comprises an adjusting member (501) and return blocks (502), the return blocks (502) are symmetrically arranged at two ends of one side of the adjusting member (501), an elastic member (6) is arranged between the return blocks (502), and the adjusting member (501) is fixedly connected to one end of the swashplate (4).

3. The zero-steering hydraulic drive axle according to claim 1, wherein the plunger pump (301) is arranged below the plunger motor (302), an oil distribution plate (7) is arranged on one side of the plunger pump (301) and the plunger motor (302) in a sealed manner, installation support portions (24) are formed on two sides of the oil distribution plate (7), and the installation support portions (24) are coaxially connected to the rotation output device to fix the oil distribution plate in the housing (1).

4. The zero-steering hydraulic drive axle according to claim 3, wherein an oil inlet plate (8) is arranged on one side of the oil distribution plate (7) in a sealed manner, an overpressure valve (801) is formed on an outer side of the oil inlet plate (8), and the overpressure valve (801) is in sealed communication with an interior of the housing (1) for oil supply between the plunger pump (301) and the plunger motor (302).

5. The zero-steering hydraulic drive axle according to claim 3, wherein the oil distribution plate (7) is provided with a first oil way channel (1301) and a second oil way channel (1302), and two ends of the first oil way channel (1301) and the second oil way channel (1302) are communicated with the plunger pump (301) and the plunger motor (302) respectively.

6. The zero-steering hydraulic drive axle according to claim 5, wherein a bypass assembly (17) used for oil way control during drive axle idling is arranged at an upper end of the oil distribution plate (7), and the bypass assembly (17) is arranged at an upper end of the plunger motor (302); the bypass assembly (17) comprises a bypass valve (1701) and a bypass controller (1702), the bypass valve (1701) is communicated with the oil distribution plate (7), the bypass controller (1702) is used for controlling conduction or closure of the bypass valve (1701) with the first oil way channel (1301) and the second oil way channel (1302), one end of the bypass valve (1701) is arranged in the oil distribution plate (7), and the bypass valve (1701) can perform passage conduction or passage closure in the oil distribution plate (7) by rotating the bypass controller (1702).

7. The zero-steering hydraulic drive axle according to claim 3, wherein shims (23) are arranged between the oil distribution plate (7) and the plunger pump (301) and between the oil distribution plate (7) and the plunger motor (302).

8. The zero-steering hydraulic drive axle according to claim 3, wherein an outer side of one end, close to the plunger pump (301), of the oil distribution plate (7) is provided with an oil inlet passage (15), and two ends of the oil inlet passage (15) are both provided with one-way control valves (16) for controlling external oil to flow into the plunger pump (301).

9. The zero-steering hydraulic drive axle according to claim 1, wherein a first thrust bearing (1201) is arranged between the plunger pump (301) and the swashplate (4), one end of the first plunger (1001) is arranged in the first cylinder block (901), and the other end of the first plunger (1001) is matched with the first thrust bearing (1201).

10. The zero-steering hydraulic drive axle according to claim 1, wherein the rotation output device is further provided with a locking assembly (18), the locking assembly (18) comprises: a locking gear (1801) and a locking block (1802), the locking gear (1801) is fixedly connected to the output shaft (13) of the rotation output device, and the locking block (1802) is matched with the locking gear (1801) during locking.

11. The zero-steering hydraulic drive axle according to claim 1, wherein the housing (1) is further internally provided with a second transmission assembly (202), the second transmission assembly (202) has a same structure as the first transmission assembly (201), and the first transmission assembly (201) and the second transmission assembly (202) are symmetrically arranged in the housing (1).

12. The zero-steering hydraulic drive axle according to claim 11, wherein an outer side end of the first transmission assembly (201) is provided with a first gear transmission set (1901), an outer side end of the second transmission assembly (202) is provided with a second gear transmission set (1902), the first gear transmission set (1901) is provided with a first drive shaft (2001) through connection for controlling one side of the housing (1), and the second gear transmission set (1902) is provided with a second drive shaft (2002) through connection for controlling the other side of the housing (1).

\* \* \* \* \*